F. W. LANCHESTER.
PNEUMATIC TIRE.
APPLICATION FILED JUNE 10, 1919.

1,372,757.

Patented Mar. 29, 1921.
2 SHEETS—SHEET 2.

INVENTOR
F.W. LANCHESTER,
BY L. R. Kerslake
ATTORNEY

UNITED STATES PATENT OFFICE.

FREDERICK WILLIAM LANCHESTER, OF LONDON, ENGLAND.

PNEUMATIC TIRE.

1,372,757.   Specification of Letters Patent.   Patented Mar. 29, 1921.

Application filed June 10, 1919. Serial No. 303,164.

*To all whom it may concern:*

Be it known that I, FREDERICK WILLIAM LANCHESTER, a subject of the King of Great Britain and Ireland, and residing at 41 Bedford Square, London, W. C. 1, England, have invented certain new and useful Improvements in and Relating to Pneumatic Tires, of which the following is a specification.

This invention relates to improvements in valve and air chamber attachments for the road wheels of vehicles and has for its object to permit of the valve body being removed and replaced externally to the air chamber, that is to say without drawing the head of the valve body through a contracted orifice or inserting it from the interior; also to permit of the possibility of withdrawing the valve body without demounting the tire; further to permit of the valve body axis being arranged at right angles or transversely to the plane of the wheel instead of in the plane of the wheel as is customary. Such arrangement of the valves is specially applicable in the case of the tire proper and sub-tire of the resilient wheels described in the specification of my concurrent application No. 303,163. This arrangement of the valve when applied to tires of wheels of the usual type affords improved accessibility for the purpose of inflation, more particularly in the case of disk wheels.

The invention consists in a valve and air chamber attachment for the road wheel of a vehicle in which the valve body is mounted on the wheel rim transversely thereto and in which the air chamber has a radially protruding lug appropriately formed and associated with the valve seat components in such manner that the latter may be attached and detached without dismounting the tire from the wheel.

The invention also consists in a valve and air chamber attachment for the road wheel of a vehicle comprising a two-piece body screwed together from the opposite sides of the wheel.

The invention also consists in a valve and air chamber attachment for the road wheel of a vehicle, comprising additional radially protruding lugs on the air chamber, metal reinforcements for the lugs, additional pockets on the wheel rim and bolts passing through the said lugs and pockets.

I append drawings illustrating my invention in a few typical forms.

Figure 1:
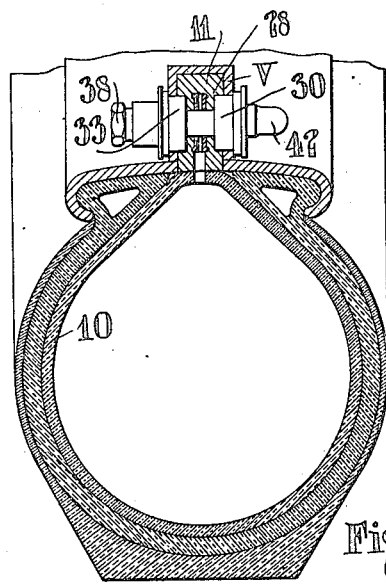
Figure 1 shows in transverse section a beaded edge tire for a wheel of the usual type.
Figure 2:
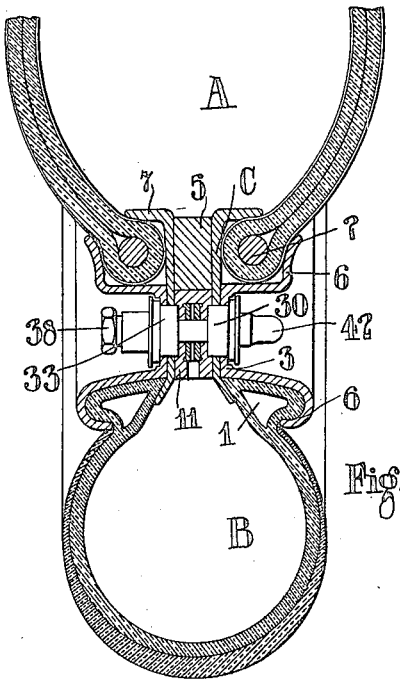
Fig. 2 is a section showing a beaded edge tire proper as applied to a resilient wheel with a pneumatic sub-tire, the inner tubes of the tire proper and of the sub-tire not being shown.
Figure 6:
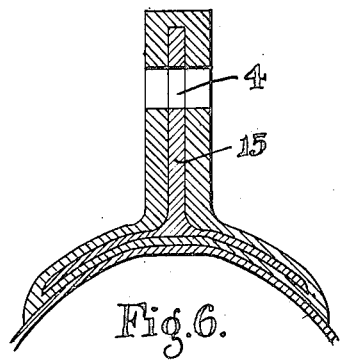
Fig. 6 is a sectional view of the reinforced valve and body.
Figure 4:
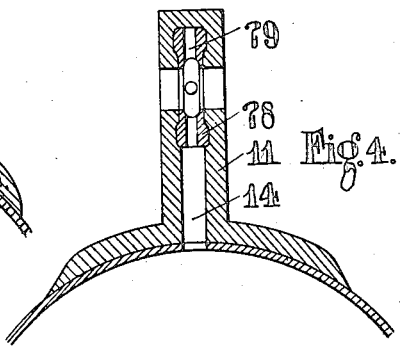
Fig. 4 is a lateral section of a lug and patch adapted to receive the valve body.

In carrying the present invention into effect as applied to a wheel of ordinary type suitable for an automobile vehicle I arrange a pocket in the floor of the rim by cutting a rectangular hole through the rim and by brazing or otherwise attaching to the lips of the said hole a part that will be referred to as the valve box V. The valve box has an open mouth corresponding to the rectangular hole in the rim, and has two flat walls parallel to the plane of the wheel and its remaining wall or walls follow an arched contour, of U shape. The flat walls of the valve box are drilled through to a diameter appropriate to that of the valve body parallel to the axis of the wheel, the position of the holes being about central to the internal contour of the pocket.

The inner tube 10 of the tire comprises the radially projecting lug 11 adapted to take its place in and fill the pocket aforesaid. This lug is conveniently made as a separate molded piece of vulcanized rubber of somewhat harder quality than the tube itself: the lug proper forms a protuberance on and is formed integral with a patch conveniently of oval form by which an adequate connection between the lug and the inner tube is obtained. The interior of the lug communicates by the duct 14 with the air chamber of the inner tube. Within it is a metal ring or washer 28 bored axially and drilled radially at several points 29, so as to provide air ducts from its bore to its periphery.

The walls of the valve lug are pierced to receive the valve body corresponding to the central hole of the washer; the holes pierced in the lug, the drilled holes in the valve box and the central hole of the washer are arranged to register when the inner tube is fitted in position.

The valve body is constructed in two parts. The seat portion 30 carrying within it a valve 36 of the usual type is provided with a flange 31 and a spigot 32 of such diameter as to approximately fit the hole in the lug; the end of the spigot is screwed and projects beyond the lug when the valve seat portion is in place. The other portion 33 of the valve body which will be referred to as the "counterpart," is screwed internally to fit the spigot and is provided with a flange 34 so that when the seat portion and the counterpart are screwed together the lug of the inner tube is hermetically secured between the two flanges, the internal washer or ring of the lug taking the pressure from wall to wall. The spigot is drilled radially at 35 to correspond with the holes drilled radially in the ring or washer 28; and an annular groove is provided so that free air communication is provided between the interior of the valve body and the air chamber of the inner tube. In one form of construction the valve 36 is inserted through the counterpart 33 to take up its correct position in relation to its seat, a cap 38 is provided to be screwed on to the counterpart to make an air-tight joint, and a central spigot 39 from the said cap serves to limit the movement permitted to the valve. The seat portion of the valve body is provided with the usual screwed termination 40 for the attachment of the inflator and with the customary stop cap 41 and dust cap 42.

To prevent the seat portion and the counterpart from unscrewing, the seat portion is provided at 44 with a flange of square or other suitable shape adapted to prevent its rotation relative to the rim or floating rim as the case may be; the screwing together being effected by turning the counterpart. The counterpart is fluted or otherwise shaped at 45 in such manner as to receive when screwed up a locking washer 46 which cannot turn relative thereto, the periphery of the locking washer at 47 being of such shape as will prevent its rotation relative to the rim or floating rim. The locking washer is retained axially in place by the head of the cap 38 aforesaid.

The holes drilled in the flat walls of the valve box are of such diameter as will admit the valve body flanges, namely the flange of the seat portion on the one hand and of the counterpart on the other, so that the valve body may be wholly unscrewed and removed without demounting the tire. External nuts and rubber washers may be provided to prevent the admission of mud or dust to the interior of the valve box, the said nuts and rubber washers fitting externally to the seat portion and counterpart respectively.

In cases where the rim is made in two halves to facilitate the mounting and demounting of the tire the valve box may itself be divided without departing from the essential features of the invention.

The inner tubes may be further fitted with lugs 12 formed of rubber vulcanized with the tube itself, these lugs being similar to the valve lug, and similarly accommodated in lug boxes brazed or otherwise attached to the rim, and similar in shape to the valve box V. The said lugs and their patches are reinforced with wire or metal at 15 perforated at 4 to receive each a bolt or pin, thus forming definite locations or anchorages for the inner tube at a sufficient number of points to prevent it creeping, and serving also as security fastenings for the beaded edges of the outer cover.

Figure 3:
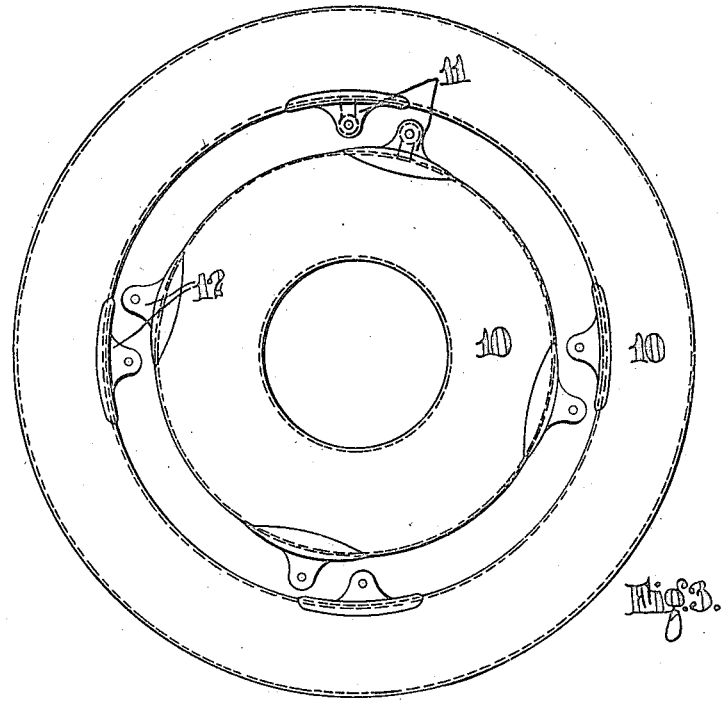
Fig. 3 is an elevation of the inner tubes with attached lugs as applied to the resilient wheel shown in Fig. 2.
Figure 5:
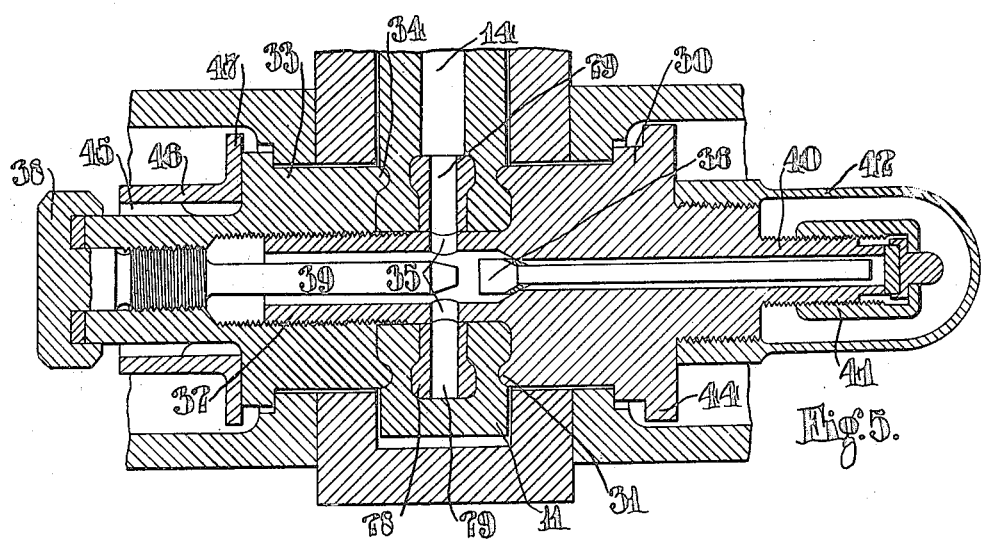
Fig. 5 is a sectional view of the valve and body. The valve body is shown in elevation in Figs. 1 and 2.

In applying the invention to a resilient wheel (Fig. 3), A is the sub-tire, B the tire proper, C a nominally rigid floating rim which forms the connection between the tire proper and the sub-tire, and a sleeve element is adapted to fasten the resilient part to the hub part of the wheel. The margins of the outer cover of the tire proper are beaded or wired at 1, in the usual well known manner. The outer edges 2 of the sub-tire are similarly beaded or wired.

The floating rim C consists of three members, viz., two external ring members 3 with clenches 6 connected by a number of through bolts, some 20 or 30 bolts being ordinarily required, and one internal member or ring 5 forming a distance or packing piece between the two external members aforesaid. The external members 3 are furnished with the usual turnover or abutment lips or clenches 6 by which the beads or edges of the tire proper and of the covering member of the sub-tire are secured, and the packing piece may be provided with counter-clenches or abutments 7 to secure the tire proper and the sub-tire from becoming detached in the event of puncture or deflation.

The tire proper and the sub-tire are furnished with inner tubes 10 in the usual manner, and for the purposes of inflation these inner tubes are provided with valve lugs 11 projecting into recesses or gaps formed in the packing piece 5. The provision of valves for both the inner tube of the tire proper and that of the sub-tire is similarly arranged.

Having now described my invention, what I claim as new and desire to secure by Letters Patent is:—

1. A valve and air chamber attachment for the road wheel of a vehicle in which the valve body is mounted on the wheel rim transversely thereto and in which the air chamber has a radially protruding lug appropriately formed and associated with the valve seat components in such manner that the latter may be attached and detached without dismounting the tire from the wheel.

2. A valve and air chamber attachment for the road wheel of a vehicle comprising a two-piece body screwed together from the opposite sides of the wheel.

In testimony whereof I have signed my name to this specification.

FREDERICK WILLIAM LANCHESTER.